United States Patent [19]
Hendriks

[11] Patent Number: 6,141,153
[45] Date of Patent: Oct. 31, 2000

[54] OPTICAL SCANNING DEVICE AND OPTICAL APPARATUS FOR READING AND/OR WRITING INFORMATION IN AN INFORMATION PLANE PROVIDED WITH SUCH A DEVICE

[75] Inventor: Bernardus H. W. Hendriks, Eindhoven, Netherlands

[73] Assignee: U.S. Philips Corporation, New York, N.Y.

[21] Appl. No.: 09/369,538

[22] Filed: Aug. 6, 1999

[30] Foreign Application Priority Data

Aug. 7, 1998 [EP] European Pat. Off. .............. 98202673

[51] Int. Cl.[7] .............................. G02B 27/30; G02B 3/00
[52] U.S. Cl. .......................... 359/641; 359/650; 359/651; 359/642
[58] Field of Search .................................... 359/641, 629, 359/820, 793, 794, 719, 650, 651, 642

[56] References Cited

U.S. PATENT DOCUMENTS

| | | |
|---|---|---|
| 4,721,373 | 1/1988 | Sugiyama ................................ 350/482 |
| 4,753,524 | 6/1988 | Sugiyama ................................ 350/480 |
| 5,638,221 | 6/1997 | Maruyama et al. ..................... 359/793 |
| 5,991,102 | 11/1999 | Oono ....................................... 359/820 |

FOREIGN PATENT DOCUMENTS

0727777A1  8/1996  European Pat. Off. .......... G11B 7/12

*Primary Examiner*—Georgia Epps
*Assistant Examiner*—Michael A Lucas
*Attorney, Agent, or Firm*—Michael E. Belk

[57] ABSTRACT

An optical device for optically scanning an information plane includes a radiation source for supplying a scanning beam, and an objective system for focusing the scanning beam to a scanning spot on the information plane. The temperature dependence of the objective system can be compensated by a compensator which includes a planoconvex first element and a planoconcave second element arranged between the radiation source and the first element, the convex surface of the first element confronting the concave surface of the second element, and the refractive indices of the first and the second element being equal at the design temperature but having a different temperature dependence.

8 Claims, 3 Drawing Sheets

OPTICAL SCANNING DEVICE AND OPTICAL APPARATUS FOR READING AND/ OR WRITING INFORMATION IN AN INFORMATION PLANE PROVIDED WITH SUCH A DEVICE

BACKGROUND OF THE INVENTION

1. Field of the Invention

The invention relates to the field of optical recording of information on disk or tape and reading the information; and is most closely related to optical lens systems for focusing laser beams for such optical storage and/or retrieval.

2. Description

The invention relates to an optical device for optically scanning an information plane, comprising a radiation source for supplying a scanning beam, and an objective system for focusing the scanning beam to a scanning spot on the information plane.

The invention also relates to an apparatus for reading and/or writing an optical record carrier provided with such a scanning device.

The information plane may be the plane of an optical record carrier in the form of a disc or a tape in which the optically readable information is present or may be stored. Such a record carrier is, for example, the known compact disc (CD) for audio or CD-ROM for data or a record carrier derived therefrom, such as the DVD. The information plane may also be the surface of another object which can be examined, for example, with a scanning microscope.

Notably for optical record carriers, there is an increasing need of a scanning device with which increasingly smaller details can still be read distinctly, because one wants to store an increasing quantity of information on the record carrier. The quantity of information which can be stored on an optical record carrier depends, inter alia, on the size of the scanning spot which is formed by the scanning device on the information plane of the record carrier. As the scanning spot is smaller, the information density may be larger. The size of the scanning spot may be reduced by increasing the numerical aperture (NA) of the beam with which the scanning spot is formed.

An attractive possibility of increasing the NA without the costs for the objective system becoming too high, and the image field becoming too small, and without causing the problems due to the dispersion of the material from which the lens is formed, is to arrange a planoconvex lens between the actual objective lens and the record carrier. This planoconvex lens, also referred to as solid immersion lens or slider lens, may be situated at a very small distance from the record carrier, but also at a slightly larger distance, for example, 300 $\mu$m. The converging function of the objective system is then distributed across he actual objective lens and the planoconvex lens. An advantage of the use of the planoconvex lens is that this lens introduces hardly any aberrations in the radiation beam.

A scanning device provided with such a planoconvex lens is known from EP-A 0 727 777. This device includes an optical scanning head with an objective lens and a planoconvex lens which converge a radiation beam to a numerical aperture of 0.84 for scanning a record carrier. The planoconvex lens may be arranged in a slider which is in sliding contact with the record carrier or floats on an aircushion.

The objective system is sensitive to changes of the refractive index or the temperature. The tolerances for these changes may be alleviated by using separate drivers (actuators) for the objective lens and the planoconvex lens, so that these elements cannot only be moved with respect to the record carrier, but also with respect to each other. The separate drivers complicate the scanning device, render it more sensitive to disturbances, and make it more expensive, which are great disadvantages, particularly for consumer uses. It is therefore preferred, to use a rigid objective system, i.e. a system in which the objective lens and the planoconvex lens are fixed with respect to each other. The elements of the objective system are preferably glass-replica lenses or completely synthetic material lenses. A replica lens is a lens consisting of a basic shape of glass on one or two refracting surface(s) on which a layer of transparent synthetic material is provided. The surface of the synthetic material layer may easily be given an aspherical shape by means of a mold and a replica technique. The glass basic shape with the layer of synthetic material, which is in a sufficiently weak state, is pressed against a mold surface which is the negative of the desired shape and the material is subsequently cured. Also a lens element which consists completely of a synthetic material can easily be given one or two aspherical surface(s), for example, by means of molding. Those skilled in the art are hereby directed to U.S. Pat. No. 4,753,524. The above citations are hereby incorporated herein in whole by reference.

SUMMARY OF THE INVENTION

A glass-replica lens as described in EP-A 0 727 777, has the drawback that the refractive index changes due to temperature fluctuations in the desired wide temperature range of, for example $-5°$ C., to $+50°$ C. are too large, so that the required quality of the scanning spot can no longer be achieved.

It is an object of the invention to provide a scanning device of the type described in the opening paragraph, including a rigid objective system in which the influence of temperature changes on the optical behavior is substantially eliminated. The device according to the invention has a temperature compensator including a cemented doublet of a planoconvex first element and a planoconcave second element arranged between the radiation source and the objective system. The convex surface of the first element is arranged against the concave surface of the second element, and the refractive indices of the first and the second element are substantially equal at the design temperature but having a different temperature dependence.

The invention is based on the recognition that the temperature dependence of the objective system can be compensated by arranging an extra element, the temperature compensator, in the path of the radiation beam. The compensator does not have any optical strength at the temperature for which the refractive indices of the system have the values on which the design of the system was based, referred to as the design -temperature in this description, but acquires such an optical strength at a change of the temperature that the spherical aberration produced at the temperature change in the objective system can be compensated. Since the compensator consisting of two elements has a flat entrance and exit surface and the refractive indices of these elements are equal at the design temperature, this compensator has no optical strength at the design temperature. Since the interface between the two elements in the compensator has a curvature, and these elements have a different temperature dependence dn/dT, the compensator acquires an optical strength at a temperature which is different from the design temperature.

For example, if the objective system is designed for focusing a parallel radiation beam on the information plane of the record carrier, the beam entering the compensator will be a parallel beam and, at the design temperature, the beam exiting from the compensator will also be a parallel beam. At a different temperature, however, the beam exiting from the compensator will be slightly diverging or converging, depending on the change in the objective system caused at that temperature.

It is to be noted that U.S. Pat. No. 4,753,524 describes a lens system for reading a disc-shaped optical record carrier which consists of a cemented doublet on the object side and a single lens element or a combination of a positive and a negative lens element on the image side. Conditions are given for the Abbe factors of the lens elements and for the temperature dependence of the refractive indices of these elements, in order that the lens system is independent of wavelength and temperature. As regards the temperature compensation, it is stated that the change, occurring at a temperature change, of the radii of curvature of the lens surfaces is compensated by a change of the axial thickness of the lens elements. It is further stated that the lens holder may undergo a considerable change at a temperature change so that the position of the focus changes, and that a choice has been made to change the refractive indices at an increasing temperature in such a way that there is an intensified change in the position of the focus. The refractive indices of the elements of the doublet are, however, different and the doublet has at least one, and in most embodiments two, curved outer surfaces. This doublet does not satisfy the condition that it should not have an optical strength at the design temperature.

Both elements of the compensator according to the invention may consist of a synthetic material, with the material for one element being of course different than that for the other element. These synthetic materials should then satisfy two criteria: maximally equal refractive indices at the design temperature and a different temperature dependence of the refractive indices.

In a preferred embodiment of the device one of the elements of the compensator consists of glass and the other element consists of a transparent synthetic material.

Since the refractive index of glass has a negligible temperature dependence, only the criterion that the refractive index of the synthetic material must be maximally equal to that of glass should be observed.

If intended for use in combination with a radiation beam having a wavelength of 650 nm, these in this preferred embodiment the glass is BAK4 and the synthetic material is Diacryl.

At this wavelength, the refractive index of the glass is then 1.566 and that of the synthetic material is 1.565, i.e. substantially equal to that of the glass.

The measure according to the invention is usable for various optical devices but may be particularly used to great advantage in a scanning device in which the objective system includes an objective lens and a planoconvex lens, the objective lens being situated on the object side and the planoconvex lens being situated on the image side, the convex surface of the planoconvex lens facing the objective lens.

As already noted, a large numerical aperture can be provided in a relatively simple manner with such an objective system. Particularly for optical devices having a large numerical aperture, for which strict requirements are imposed on the optical quality of the elements of the device and of the device as a whole, the measure according to the invention fulfills a great need.

The objective system of the scanning device may also be sensitive to wavelength changes because the material of the elements of this system has different refractive indices for different wavelengths; in other words, it shows dispersion. Particularly in a scanning device with which information must be both written and read and in which the intensity of the radiation source, in the form of a diode laser, must be switched between a reading level and a considerably higher writing level, this may yield problems because an offset of several nms of the emitted wavelength may occur when switching the diode laser. Due to the dispersion of the materials of the objective system, the focus of the radiation beam may get beyond the information plane of the record carrier at such a wavelength offset.

In an embodiment of the scanning device which is highly insensitive to wavelength changes the elements of the compensator have different Abbe numbers.

The Abbe number of an optical material is a measure of the dispersion of the material and indicates the extent of change of the refractive index of the material at a wavelength change of the beam passing through the material. The materials of the elements of the compensator now have as much as possible the same refractive index for the design wavelength so that the compensator does not have an optical strength for a beam of that wavelength. At a wavelength change, the refractive indices of the compensator elements change to a different extent so that the curved interface between these elements will act as a converging or a diverging element. Consequently, the beam exiting from the compensator acquires a small convergence or divergence with respect to the entering beam, with which convergence or divergence the variation of the optical behavior of the objective system due to the wavelength change can be compensated.

In the device a collimator lens is arranged between the radiation source and the compensator.

The collimator lens, which may consist of one or more lens element(s), converts the diverging beam supplied by the source into a parallel beam. As a result, the design of the objective system will be simpler than that of an objective system which must focus a diverging beam on the information plane.

The invention also relates to an apparatus for reading and/or writing information in an information plane of an optical record carrier. This information apparatus, includes an optical device for forming a scanning spot on the information plane, a radiation-sensitive detection system for converting radiation from the information plane into electric signals, and apparatus for moving the scanning spot and the information plane with respect to each other, preferably, the optical device is the device as described hereinbefore.

These and other aspects of the invention are apparent from and will be elucidated with reference to the embodiments described hereinafter.

DETAILED DESCRIPTION OF THE PREFERRED EMBODIMENT

Figure 1:
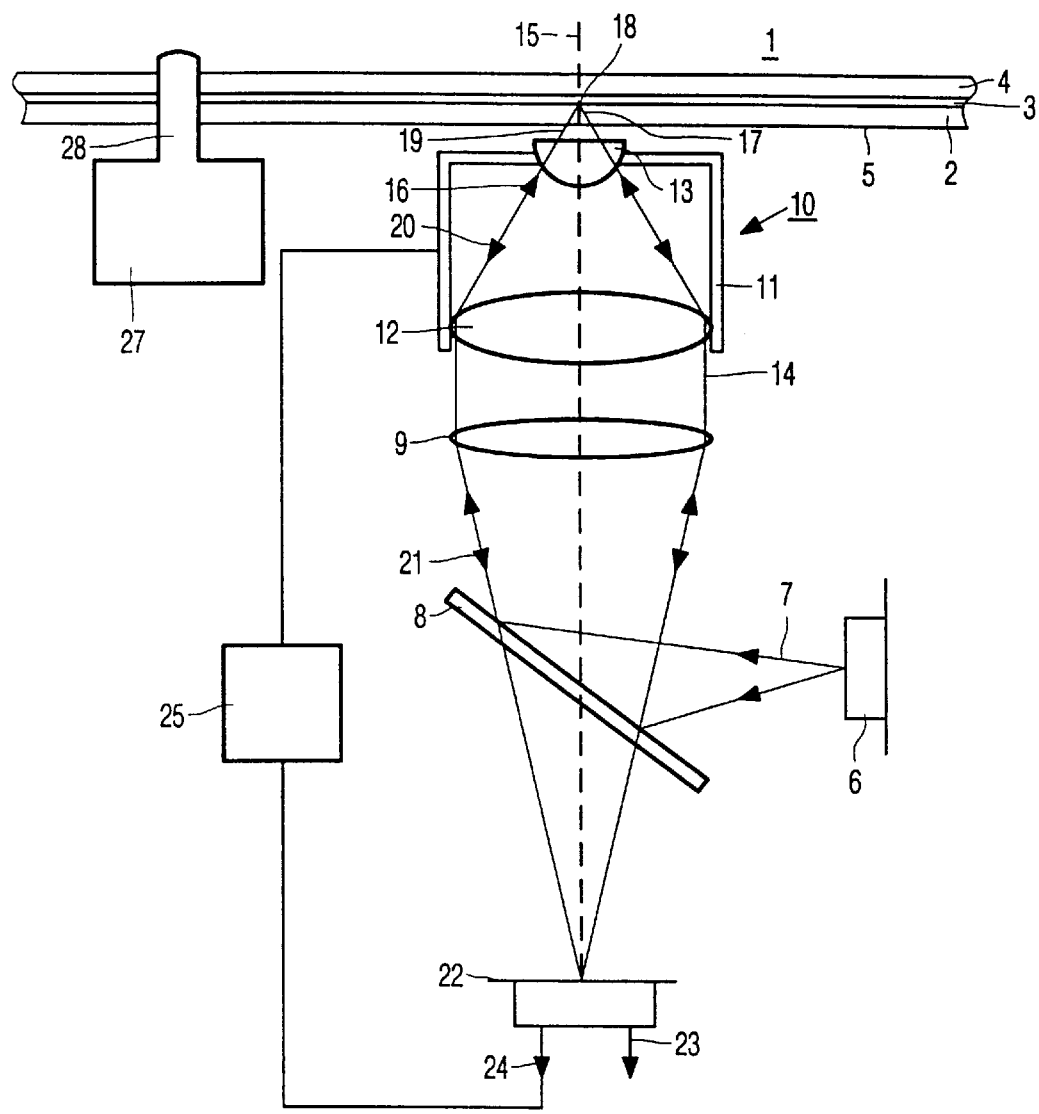
FIG. 1 shows a part of an embodiment of an optical apparatus for reading and/or writing an optical record carrier, provided with a scanning device.

FIG. 1 shows a part of a round disc-shaped optical record carrier 1 in a radial cross-section. This record carrier includes a transparent layer 2, one side of which is provided with an information layer 3. The side of the information layer 3 remote from the transparent layer 2 may be protected from ambient influences by a protective layer 4. The side of the transparent layer 2 facing the scanning device is referred to as the entrance plane 5. The transparent layer functions as a substrate of the record carrier and forms a mechanical support for the information layer. It is alternatively possible for the transparent layer 2 to serve only as a protection for the information layer, while the mechanical support is provided by a layer on the other side of the information layer, for example, by the protective layer 4 or by a further information layer and a transparent layer provided on the information layer 3. The information layer 3 of the record carrier may be provided with information in the form of optically detectable areas which are arranged in substantially parallel, concentric or spiral-shaped, tracks which are not shown in FIG. 1 but are perpendicular to the plane of the drawing in the cross-section shown. The areas may have any optically detectable shape and may be, for example, pits or areas whose reflection coefficient or direction of magnetization is different from that of their ambience, or a combination of these shapes.

The scanning device includes a radiation source 6, for example, a semiconductor laser emitting a diverging radiation beam 7. This beam is reflected towards a lens system by a beam splitter 8, for example, a semi-transparent mirror. This lens system includes a collimator lens 9 and an objective system 10 which is composed of an objective lens 12 and a planoconvex lens 13. The lenses 12 and 13 are accommodated in an objective holder 11. The collimator lens 9 converts the diverging beam 7 into a collimated beam 14. The objective lens 12, which has an optical axis 15, converts the collimated beam 14 into a converging beam 16 which is incident on the lens 13. Lens 13 changes the incident beam 16 into a converging beam 17 whose focus 18 is situated on the information layer 3. The planoconvex lens 13 has a convex surface and a flat surface. The flat surface faces the record carrier 1 and is separated therefrom by means of a gap 19. The objective lens is shown in the Figure as a single lens element but may alternatively includes a plurality of lens elements, as well as a hologram which operates in transmission or reflection. The collimator lens may also include a plurality of lens elements.

By using the collimator lens, the object, the emitting surface of the radiation source, and the image, the scanning spot 18 are conjugated at infinity and the objective system receives a parallel beam. Alternatively, the collimator lens may be omitted so that a diverging beam is incident in the objective system and a conjugation of object and image at infinity must take place. Since the objective system must then converge a diverging beam, the design of this system is more difficult than in the case where a collimator lens is used.

During writing or reading information, the record carrier is rotated via a shaft 28 driven by a motor 27, by which an information track is scanned by the scanning spot 18. By moving the scanning spot and the record carrier with respect to each other in a direction perpendicular to the plane of the drawing in FIG. 1, all concentric tracks, or the entire spiral track, can be scanned. The last-mentioned movement can be provided by arranging the scanning device or a part thereof, inter alia, at least the objective system, on a slide which is movable in such the perpendicular direction. When information is being read, the radiation of the converging beam 17 reflected by the information layer 3 is modulated with the information which is stored in the successive information areas. This reflected radiation forms a reflected beam 20 which returns along the path of the on-going converging beam 14. The objective system 10 and the collimator lens 9 convert the reflected and modulated beam into a converging reflected beam 21, and the beam splitter 8 passes a part of the beam 21 to a radiation-sensitive detection system 22. The detection system receives the radiation from the beam and converts it into one or more electric signals. One of these signals is an information signal 23 which represents the information read from the information plane. Another signal is a focus error signal 24 which represents a possible axial deviation of the focus 18 with respect to the information plane 3. This focus error signal, which can be generated in various known manners, is used as an input signal for a focus control circuit 25 which drives an axial actuator (not shown) for the objective system in such a way that the axial position of the focus 18 coincides with the plane of the information layer 3. Another signal, which is supplied by the detection system 22, is a tracking error signal which is representative of a possible deviation between the center of the scanning spot and the centerline of the instantaneously read information track. This signal, which can also be generated in various known manners, is used as an input signal for a radial control circuit (not shown) which drives a radial actuator in such a way that the center of the scanning spot 18 coincides with the centerline of the track which has being read.

When information is being written in the information layer, the beam from the source is modulated with the information signal to be written. This modulation can be provided by a separate modulator in the path of this beam, for example, an acousto-optical modulator, which is controlled by the information signal to be written, or by direct control of the source with the information signal to be written. Also, when information is being written, the detection system 22 can supply a focus error signal and a tracking error signal. The information signal read from the information layer then includes information about data which have been previously provided on the record carrier, such as addresses used for writing the actual information.

Figure 2:
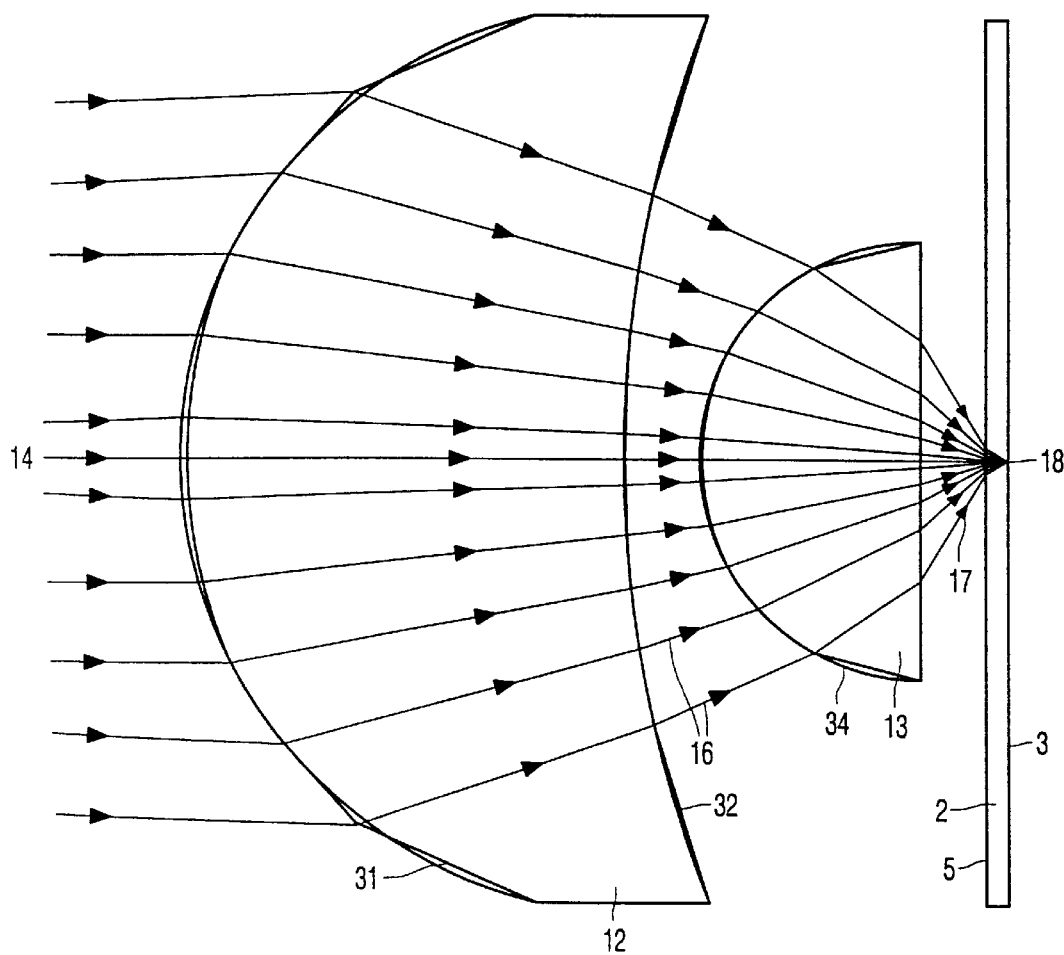
FIG. 2 shows an embodiment of the objective system of the scanning device.

FIG. 2 shows an enlargement of the objective system and the path of the radiation through this system. The objective lens may be a planoconvex lens with an aspherical surface but is preferably, a lens with an aspherical convex surface 31 and an aspherical concave surface 32, as is shown in FIG. 1. The objective lens may be designed in known manner, in such a way, that the spherical aberrations introduced by the planoconvex lens 13 and the transparent layer 2 can be compensated thereby, so that the scanning beam 17 proximate to the focus, or scanning spot, 18 is essentially free from spherical aberration. The convex surface 34 of the lens 13 is preferably also aspherical. The aberration correction can then be ensured by a plurality of lens surfaces so that a better and simpler correction is possible.

The replica process is preferably used for forming aspherical surfaces such as the surfaces 31, 32 or 34. The process starts from a glass lens element as a preform and a layer of transparent synthetic material such as a curable polymer is provided in a sufficiently soft state on one or both refractive surfaces of the lens element. The outer surface of such a layer is given the desired shape by pressing a mold against it, whose inner surface is a negative of the desired surface. Subsequently, the synthetic material layer is cured, whereafter the lens element is released from the mold or molds. The synthetic material may be the material manufactured under the name of Diacryl by the firm of Akzo, with the product description: Di-ethoxylated Bisphenol A Dimethacrylate and the Chemical Abstract no.: CAS no. 2448-20-2. This material can be cured with UV radiation.

Also a lens element which is completely made of a synthetic material by means of, for example, an injection molding process, may be provided with one or two aspherical surfaces in a relatively simple way. In the process of injection molding the lens element, use is made of a mold or of two molds, with the inner surface of such a mold being a negative of the desired lens surface. Known materials for these types of lenses are Polymethyl Methacrylate (PMMA) or Polycarbonate (PC). The formation of aspherical lens surfaces in synthetic material has the advantage that a cumbersome grinding and polishing process, as would be required for a glass lens element, can be dispensed with.

Lens elements having a synthetic material layer or entirely consisting of a synthetic material are, however, sensitive to temperature variations. Particularly the change of the refractive index of the synthetic material occurring at a temperature change causes a change of the optical behavior of the lens element. Moreover, the temperature change may also result in a change of the shape of the element. At the same temperature change, the change of the refractive index has a considerably greater influence on the optical behavior than a change of the shape. The variations of the optical behavior of the objective system, occurring at temperature variations and resulting in spherical aberrations, particularly occur in systems having a large numerical aperture, such as the above-described scanning device which may have an NA of 0.85.

Figure 3:
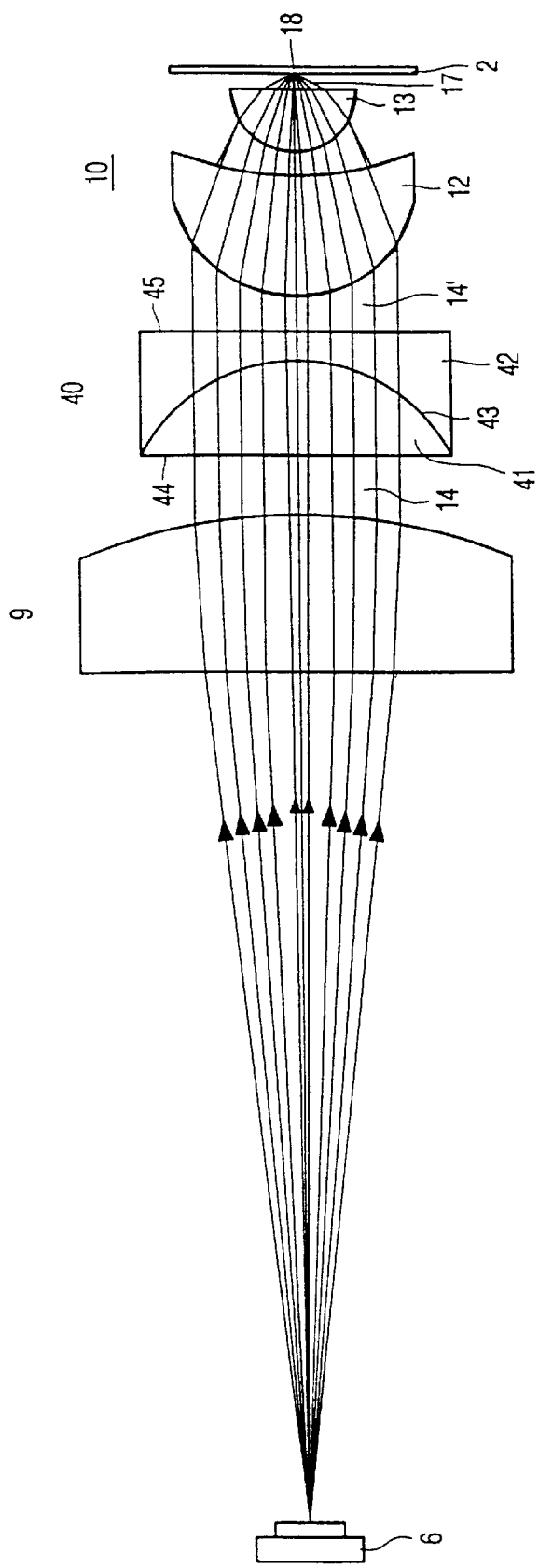
FIG. 3 shows an embodiment of the scanning device with a temperature compensator.

To considerably reduce the temperature effects, a temperature compensator, as shown in FIG. 3, is arranged in the radiation path preceding the objective system. This compensator 40 consists of a first, planoconvex, lens element 41 and a second, planoconcave, lens element 42. These lens elements essentially have the same refractive index at the design temperature, for example 20° C., so that there is no refractive index difference at this temperature for the radiation beam 14 at the curved interface 43 between the first and the second element. Since the outer surfaces 44 and 45 of the compensator 40 are flat, this compensator has no optical strength at the design temperature, i.e. the parallel beam 14 entering the compensator leaves this compensator as a parallel beam 14'.

However, the refractive indices n of the materials of the elements 41 and 42 have a different temperature dependence dn/dT. At a temperature which deviates enough from the design temperature, the refractive indices of the elements 41 and 42 will therefore be different. Then, the radiation beam 14 has a refractive index difference at the interface 43 and since this interface is curved, it will act as a refractive lens surface. The compensator then has a small optical strength and renders the beam slightly converging or diverging, depending on the temperature change. By choosing a suitable shape for the interface 43, the temperature dependence of the objective system 10 can be compensated by the temperature-dependent optical strength of the compensator 10, so that, in the total system 40, 10 is no longer temperature-dependent.

The material of one of the elements 41, 42 is preferably glass and that of the other element is a synthetic material. Since the refractive index of glass is substantially independent of the temperature, the choice of the synthetic material is made easier. In fact, all refractive indices of the suitable synthetic materials have a temperature dependence which is different from that of glass, so that the requirement to be imposed on the synthetic material is only that the refractive index of this material at the design temperature should be equal as much as possible to that of the glass.

In an embodiment of the scanning device according to the invention, the glass element is formed from the glass of the type number BAK4, whose refractive index is 1.566 at a wavelength of 650 nm, while the synthetic material element consists of the aforementioned material Diacryl from the firm of Akzo, and has a refractive index 1.565 at the design temperature. In this embodiment, the NA of the objective system is equal to 0.85 and the radius of curvature of the spherical interface 43 is equal to −2.925 nm. The temperature tolerances of this device are a factor of 6 better than those of a device without the temperature compensator.

If changes of the shape in the objective system, such as changes of the curvatures of the surfaces or the thickness of the lens elements, also affect the optical behavior of the objective system, these changes can be compensated by adapting the curvature of the interface 43.

The embodiment of FIG. 3 is provided with a collimator lens 9 in order that the beam 14 and, at the design temperature, also the beam 14' are parallel beams. If the objective system 10 is designed in such a way that it can focus a diverging beam to the desired scanning spot 18, the collimator lens 9 may be dispensed with.

The invention may also be used in a scanning device which has a numerical aperture of less than 0.85 and in which temperature effects occur. The objective system of such a device may consist of only the objective lens 12 which may consist of only a single, for example, bi-aspherical, lens element or of a plurality of lens elements.

In a scanning device in which wavelength changes may occur, as in a device used in an apparatus with which information can be both written into and read from a record carrier, the axial position of the focus of the scanning beam may be offset with respect to the information plane due to the dispersion of the materials of the objective system, so that, the scanning spot on the information plane becomes too large and crosstalk may occur between adjacent information tracks and successive information areas. To render the scanning device insensitive to wavelength changes, materials whose refractive indices at the design wavelength are equal but have a different wavelength dependence dn/dλ, may be chosen for the elements 41 and 42 of the compensator 40. Then, the compensator has no optical strength at the design wavelength, because there is no refractive index difference at the interface 43 and the outer surfaces of the compensator are flat. At a wavelength which deviates enough from the design wavelength, a refractive index difference does occur on the curved interface 43 so that this interface has a lens action. The compensator then has a small optical strength and renders the beam 14' slightly converging or diverging, depending on the wavelength change. The wavelength dependence of the objective system can be compensated by the wavelength-dependent optical strength of the compensator, so that the total system 40, 10 is no longer wavelength-dependent.

The invention has been described with reference to its use in an apparatus for reading and/or writing information in an optical record carrier but it is not limited thereto. The invention may be used wherever scanning must take place at a high resolution, i.e. with a small scanning spot. Examples are scanning optical microscopes having a very high resolution or optical inspection apparatuses having a high resolving power for various uses.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. The scope of the invention is not limited to the embodiments, but lies in each and every novel feature or combination of features described above and in every novel combination of these features. Thus, the scope of the invention is only limited by the following claims:

What is claimed is:

1. An optical device comprising:
    a radiation source for supplying a scanning beam;
    an objective system for focusing the scanning beam to a scanning spot on an information plane; and
    a temperature compensator including a cemented doublet of a planoconvex first element and a planoconcave second element arranged between the radiation source and the objective system, the convex surface of the first element confronting the concave surface of the second element, and the refractive indices of the first and the second element being substantially equal at the design temperature but having a different temperature dependence.

2. The optical device of claim 1, in which one of the elements of the compensator consists of glass and the other element consists of a transparent synthetic material.

3. The optical device of claim 2, in which the glass is BAK4 and the synthetic material is Diacryl.

4. An optical device of claim 1, in which the objective system includes an objective lens and a planoconvex lens, the objective lens being situated on the object side and the planoconvex lens being situated on the image side, the convex surface of the planoconvex lens facing the objective lens.

5. An optical device of claim 1, in which the elements of the compensator have different Abbe numbers.

6. An optical device of claim 1, in which a collimator lens is arranged between the radiation source and the compensator.

7. An apparatus comprising:
    an optical device for forming a scanning spot on an information plane;
    a radiation-sensitive detection system for converting radiation from the scanning spot into electric signals; and
    means for moving the scanning spot and the information plane with respect to each other
    and in which the optical device includes:
        a radiation source for supplying a scanning beam;
        an objective system for focusing the scanning beam to provide the scanning spot on the information plane; and
        a temperature compensator including a cemented doublet of a planoconvex first element and a planoconcave second element arranged between the radiation source and the first element, the convex surface of the first element confronting the concave surface of the second element, and the refractive indices of the first and the second element being substantially equal at the design temperature but having a different temperature dependence.

8. The apparatus of claim 7 in which the radiation from the scanning spot is reflected from the information layer.

* * * * *